Nov. 26, 1968  J. J. SMITH  3,412,742
SQUEEZE TYPE CORPORATION STOP
Filed March 25, 1964  2 Sheets-Sheet 1
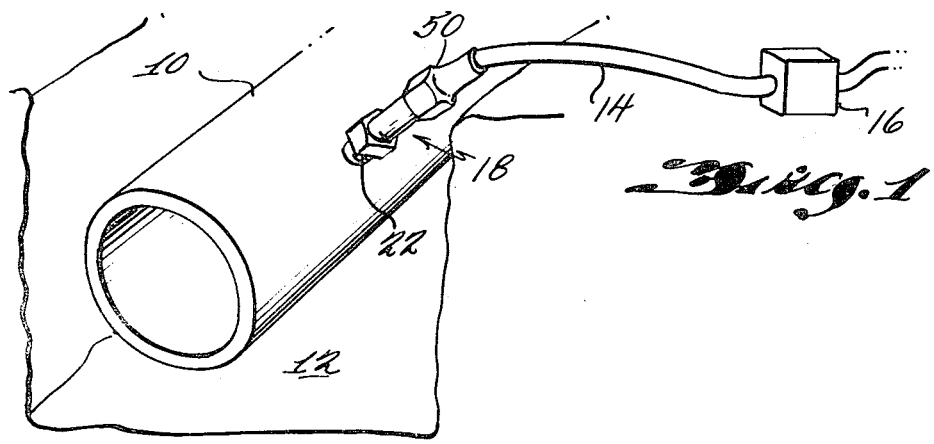
Fig. 1
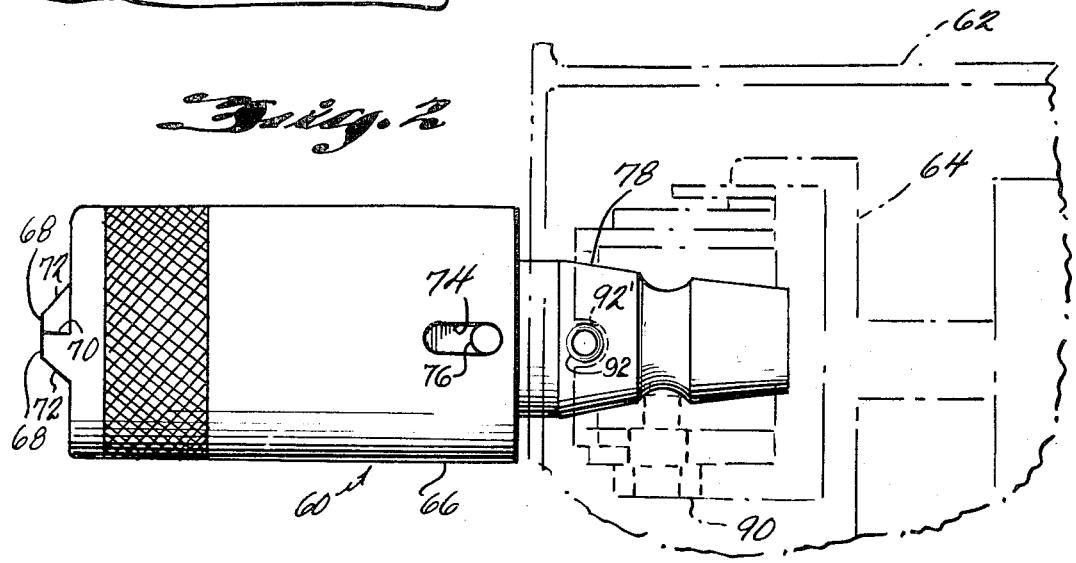
Fig. 2
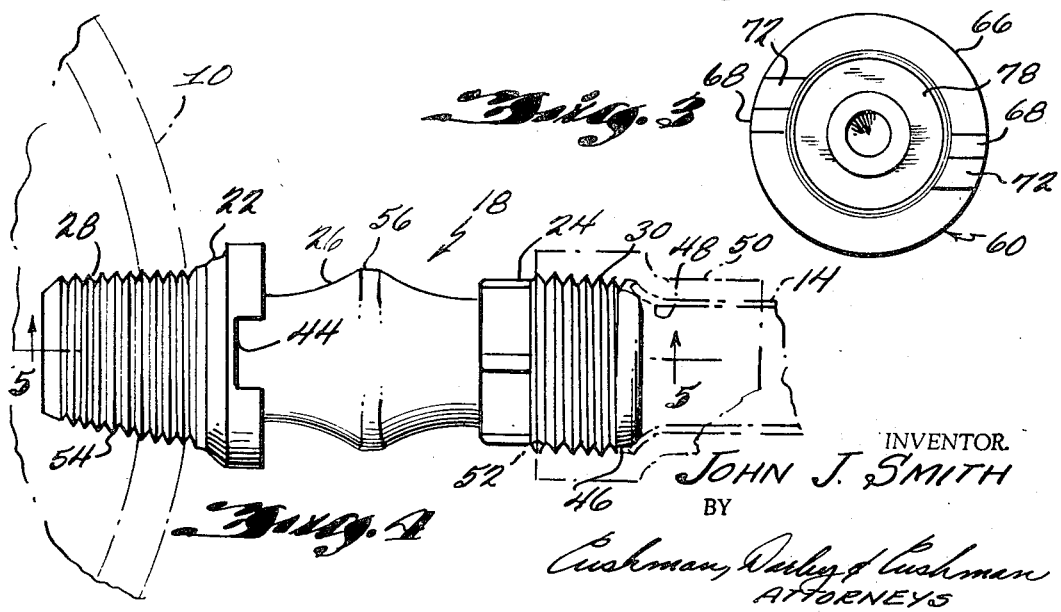
Fig. 3
Fig. 4
INVENTOR.
JOHN J. SMITH
BY
Cushman, Darby & Cushman
ATTORNEYS

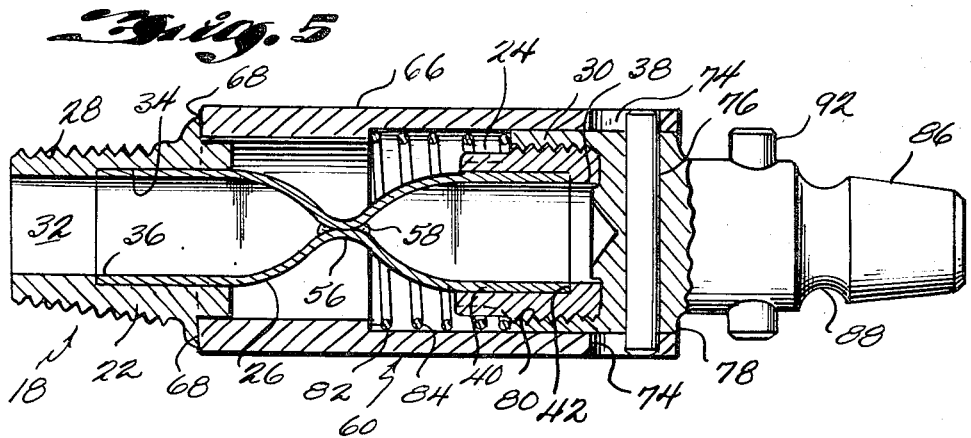

United States Patent Office 3,412,742
Patented Nov. 26, 1968

3,412,742
SQUEEZE TYPE CORPORATION STOP
John J. Smith, Decatur, Ill., assignor to Mueller Co.,
Decatur, Ill., a corporation of Illinois
Filed Mar. 25, 1964, Ser. No. 354,639
15 Claims. (Cl. 137—68)

The present invention relates to a corporation stop or valve and, more particulary, to a corporation stop used in connecting a service line to a fluid main, the fluid main having fluid under pressure therein.

Heretofore, corporation stops have been used in connecting a service line to a fluid main such as a water main, the stop including a valve which is maintained closed when installing the stop in the main. This enables the service line to be connected to the water main, as well as to the shutoff valve box for the dwelling or building. The corporation stop is only used once and thus once the service line has been connected to the main, and then connected to the box, which serves as the normal shutoff valve for dwelling service, the corporation stop is opened and ordinarily never used again. After the closed corporation stop is attached to the water main and to the dwelling or building through a service pipe, it is then opened and the main, corporation stop, and service pipe are paved over or covered with dirt.

In the past, corporation stops included an expensive brass valve having lapped ground valve seating surfaces. As mentioned above, once this valve was installed in position and opened, it was usually never used again.

An object of the present invention is to provide an improved corporation stop adapted to be used in situations where the valve is usually operated one time, the corporation stop being a very inexpensively manufactured and installed valve.

Another object of the present invention is to provide an improved corporation stop utilizing a pinch type valve made from a malleable or ductile metal such as copper and capable of being opened at least once.

Still another object of the present invention is to provide a corporation stop which may easily be installed on a water main while the main has pressure therein by means of a drilling and tapping machine such as the Mueller Co. B-100 Drilling and Tapping Machine.

Ancillary to the preceding object, it is a further object to provide such a corporation stop with a pinch valve, the pinch valve being positively maintained in the closed position until after the corporation stop has been connected both to the main and to the service line.

A further object of the present invention is to provide a corposation utilizing a tube or pipe made of malleable and ductile metal, such as copper, the tube being pinched together and capable of being opened by a pipe squeezer having opening jaws installed thereon for re-shaping pipes.

These and other objects and advantages, as well as the scope of the present invention, will appear more fully when considered in light of the following detailed description in the specification, appended claims, and drawings, in which:

FIGURE 1 is a fragmentary schematic view illustrating the corporation stop of the present invention installed so as to operatively connect a service line with a fluid main under pressure;

FIGURE 2 is a side elevational view of a screw plug used with a drilling and tapping machine for inserting the corporation stop into a main;

FIGURE 3 is an end view of the tool or plug shown in FIGURE 2 and looking from the left-hand side of such figure;

FIGURE 4 is a side elevational view of the corporation stop of the present invention illustrating the pinch valve in the closed or pinched position and further showing the same connected to a main and a service pipe, the main and service pipe being shown in broken lines;

FIGURE 5 is a sectional view through the corporation stop shown in FIGURE 4, the view being taken substantially on the section line 5—5 of FIGURE 4 and further illustrating the corporation stop positioned within the tool or plug of FIGURE 2.

FIGURE 6 is a top plan view of a modified form of corporation stop of the present invention;

FIGURE 7 is a sectional view of the modified corporation stop of FIGURE 6 taken on the line 7—7 of FIGURE 6; and FIGURE 8 is a sectional view of the modified corporation stop taken on the line 8—8 of FIGURE 7 and illustrating blocks pinching the shutoff and maintaining the valve of the corporation stop in a closed position for installation into a water main.

Referring now to the drawings wherein like character and reference numerals represent like or similar parts, and in particular to FIGURE 1 thereof, a water main generally indicated at 10 is shown in a ditch or excavation 12, the water main 10 being connected to a service pipe or line 14 leading to a dwelling or building (not shown) through a curb box schematically represented at 16. The curb box has the normal shutoff valve for the dwelling or building (not shown) so that water can be selectively turned off or on from the outside of the dwelling. The service pipe 14 is connected to the main by means of a corporation stop of the present invention generally indicated at 18. The corporation stop 18 is installed directly into the main 10 by use of a drilling and tapping machine such as the aforementioned Mueller Co. B-100 Drilling and Tapping Machine.

One form of the corporation stop 18 of the present invention is best shown in FIGURES 4 and 5 and includes an inlet member or fitting 22, an outlet member or fitting 24, and a piece of copper tubing or pipe 26 extending between and connected to the inlet and outlet members. The inlet and outlet members 22 and 24, respectively, are made of brass and have exterior threads 28 and 30, respectively, machined thereon, the threads 28 and 30 being substantially identical to the threads on a conventional corporation stop or cock.

The inlet member or fitting 22 is provided with a through bore 32 having a counterbore 34 at its inner end, the counterbore defining an interior annular shoulder 36 for abutting the end of the copper tube 26 received in the counterbore 34. The outlet member 24 is similarly provided with a through bore 38 having a counterbore 40 therein defining an interior annular shoulder 42 for abutting the other end of the copper tube 26. Silver solder or other suitable means may be used to retain and seal the ends of the copper tube 26 in the counterbores 34 and 40, respectively.

Inlet member or fitting 22 is provided at its inner end with a pair of oppositely disposed radially extending cutouts or slots 44, the purpose of which will be defined in more detail later in the specification. The outlet member or fitting 24 is provided with a convex surface 46 at its outer end, the convex surface 46 being arranged to oppose a convex surface 48 on the flared end of the service pipe 14 so that a line contact is initially made when a nut or socket 50 having interior threads 52 is threaded onto the exterior threads 30 of the outlet member or fitting 24. The inlet member or fitting 22 is provided with the usual corporation stop having tapered threads 54 for threading the same directly into the wall of the water main 10. Any suitable drilling and tapping machine such as the aforementioned Mueller B–100 Drilling and Tapping Machine may be used to install the corporation stop 18 in the water main 10.

When the corporation stop 18 is assembled, the intermediate portion of the copper tube or pipe 26 is pinched as indicated at 56 in FIGURES 4 and 5 to a position where the interior walls thereof are in sealing contact so that the tube acts as a closed pinched valve. The tube 26 is left in its pinched or closed position 56 until after the corporation stop is installed on the water main 10 and connected to the service line 14 with the service line, in turn, being connected to the box 16 for the standard shut-off valve for the building or dwelling. After the above connections have been made and it is desired to place the service line 14 in operation, then the tube or pipe 26 is squeezed by a conventional pipe squeezer (not shown), the pipe squeezer having conventional opening jaws attached in place of or on its squeezing jaws for re-shaping the pipe to provide passage through the bore therein and, thus, through the corporation stop 18.

In some installations where the pressure of the water in the water main is extremely high, such high pressure by itself is sufficient to cause the pinched portion 56 of the tube to spring open as soon as the corporation stop 18 is attached to the water main. Unless the service pipe 14 has been connected, this situation could result in a very unsatisfactory operation, and dangerous condition. In order to obviate such a situation and to eliminate any tendency for the copper tube or pipe 26 from springing open from its closed squeezed position as indicated at 56, the tube or pipe 26 is provided with plain solder internally and at the squeezed portion such as indicated at 58 in FIGURE 5. The plain solder 58 is applied to the contacting interior walls of the squeezed portion 56 at the time the corporation stop 18 is assembled, and such plain solder 58 can be easily broken when it is desired to positively open the pinched portion 56 of the copper tube 26 by use of positive means such as the aforementioned conventional pipe squeezer having the jaws thereon for re-shaping squeezed pipe.

As best shown in FIGURES 2, 3, and 5, a special tool or screw plug 60 is adapted to be used with a chuck 64 of a conventional drilling and tapping machine 62 for installing the corporation stop 18 directly onto the water main 10. As is well known in the art, the drilling and tapping machines are capable of making a seal, for example, with the exterior walls of a water main and then drilling a hole into the main and tapping threads in such a hole while pressure is maintained on the water within such main. Also, the drilling and tapping machines are capable of use in installing plugs, nipples and the like in the tapped hole.

When using a drilling and tapping machine, such as the Mueller Co. B–100 Drilling and Tapping Machine, which is indicated in broken lines by the numeral 62, the tool or screw plug 60 is first installed on the corporation stop 18 and then is attached to the chuck 64 of the machine 62. In more detail, the tool or plug 60, which is a tubular member fitting over the corporation stop 18, includes a sleeve portion 66 having ratchet teeth 68 on its open end. The ratchet teeth 68 are provided with an axially extending surface 70 for abutting a surface in the cutout portions or slots 44 of the inlet member fitting 22 when the sleeve is rotated in one direction and a sloping camming surface 74 for camming the sleeve to the right of FIGURES 2 and 5 when the sleeve is rotated in a counter-direction.

Sleeve member 66 is provided with a pair of opposed, longitudinally extending slots 74 at its end opposite the end having the ratchet teeth or lugs 68, the slots receiving the outer ends of a pin 76 carried in a socket or nut portion 78 of the tool 60. The socket portion 78 is provided with interior threads 80 adapted to threadedly receive the exterior threads 30 of the outlet member or fitting 24. As will now be appreciated, sleeve portion 66 can move longitudinally with respect to socket portion 78 but cannot rotate relative thereto. The sleeve portion 66 is provided with an interior shoulder 82 which is arranged to abuttingly receive one end of a coil spring 84. The other end of the coil spring 84 abuts the end of the socket portion 78 received in the sleeve portion 66 and thus normally urges the sleeve portion 66 and the socket portion 78 longitudinally away from each other. Socket portion 78 is provided with an outer end 86 for fitting into the chuck 64. The end 86 is provided with an external annular groove 88 for receiving the end of a lock screw 90 which prevents longitudinal movement of the socket portion relative to the chuck. A pin 92 extending radially from the end portion 86 is arranged to engage a slot 92' in the chuck whereby torque can be transferred from the chuck to the socket portion 78.

After the corporation stop 18 is assembled the tool or screw plug 60 is threaded onto the outlet member 24 until its ratchet teeth or lugs 68 engage in the cutout portions 44 of the inlet member 22. This unit is then placed in the chuck 64 of the drilling and tapping machine 62 and the corporation stop 18 is ready for installation into a tapped hole in the main 10. The torque from the chuck 64 of the drilling and tapping machine 62 is transferred to the corporation stop 18 through the tool or plug 60, but it will be noted that such torque is not applied to the malleable and ductile copper tube 26, but, on the contrary, is by-passed around such tube directly to the inlet fitting 22 through the ratchet teeth or lugs 68. When the corporation stop 18 has been secured directly into the main, then the chuck 64 is rotated in the opposite direction and this causes the tool or plug 60 to rotate in an opposite direction thus unthreading the same from the outlet member 24. It will be understood that the ratchet teeth 68 will cam out of the cutout portions or slots 44 and move the sleeve portion 66 to the right of FIGURE 2 when the tool or screw plug 60 is being unthreaded from the outlet member 24.

FIGURES 6–8 disclose a modified form of a corporation stop 18' embodying the broad principles of the invention of the corporation stop 18 shown in FIGURES 1 to 5 and heretofore described. The corporation stop 18' of FIGURES 6 through 8 includes an inlet member or fitting 22' and an outlet member or fitting 24', these members being made from brass and substantially identical to those previously described. However, it will be noted that the outlet fitting 24' is provided with cutout portions or slots 45' which are oppositely disposed from the cutout portions or slots 44' of the inlet member or fitting 22'.

In order to positively maintain the copper tube or pipe 26' pinched as indicated at 56', a pair of shutoff blocks 100 are provided, the shutoff blocks 100 each being arranged with oppositely disposed key or lug portions 102 and 104 respectively cooperating with the cutout portions 44' and 45'. Additionally, the blocks 100 have an intermediate portion 106 with a tube or pipe contacting surface 108. The flat surface 108 is at least as wide as the tube 26' when pinched as indicated at 56' so that a uniform pressure may be maintained transversely across the tube 26' and, thus ensure no leakage past the pinch valve when it is closed. Bolt means 110 extending through wings 112 of each of the blocks 100 are provided for drawing the blocks together so as to apply the necessary pressure to maintain the tube 26' in the pinched position.

It will be noted that in the modification shown in FIGURES 6–8 the application of torque to the soft copper tube 26' is avoided when installing the corporation stop 18'. In this respect, the shutoff blocks 100 function not only to maintain a uniform pressure on the pinched portion 56' of the tube 26' but also as a means of transmitting torque from the outlet fitting 24' to the inlet fitting 22' so that the torque bypasses the tube 26'. A standard release screw plug (not shown) for a drilling and tapping tool may be used on the outlet member 24' so as to detachably attach the same to the chuck of the tapping and drilling machine.

When the modified corporation stop 18' of FIGURES 6–8 is installed on the main, the drilling and tapping machine is removed but the pinched portion 56 is maintained pinched by leaving the shutoff blocks 100 in the position illustrated in the FIGURES 6 to 8 of the drawings. Before removing the blocks 100, it is necessary to connect the service pipe 14 to the outlet member 24' and when this installation is complete, and the service line has been operatively connected to the dwelling or other building, then the blocks 100 may be removed. In areas where the water pressure in the main 10 is very high, it will sometimes force contacting interior walls of the pinched portion 56' apart and permit water flow to the dwelling or building. However, it is desirable to re-shape the pipe or tube 26' and thus a conventional pipe squeezer with the modified opening jaws installed is used to re-shape the pipe.

The corporation stop of the present invention provides an inexpensive means of connecting a service pipe to a main or the like. Since this type of installation requires use of a valve only a few times, the valve usually being buried, the present corporation stop eliminates a heretofore costly part of an installation operation without reducing the effectiveness of the installation.

Having set forth the nature, objects and advantages of the present invention, it will be perceived that certain changes, adjustments, and modifications may be made to the corporation stop described herein without departing from the principle and spirit of the invention.

Therefore, terminology used throughout the specification and the details of the drawings are but for the purpose of description and not limitation, the scope of the invention being defined in the claims.

What is claimed is:

1. A corporation stop for use in making a service connection between a fluid main under pressure and a service pipe comprising: a rigid inlet member adapted to be operatively connected to the fluid main under pressure, said inlet member having a through bore; a rigid outlet member adapted to be connected to the service pipe, said outlet member having a through bore; a tube made of a malleable and ductile metal and pinched so that its inner walls are constricted into fluid tight contacting relationship, means rigidly connecting the ends of said tube in sealing engagement in the bores of said inlet and outlet members respectively; means to maintain the inner walls of said tube in fluid tight contacting relationship until the corporation stop is connected to the fluid main and the service pipe; and means detachably coupling said inlet member to said outlet member exteriorly of said tube whereby torque applied to one of said inlet and outlet members is transferred to the other of said inlet and outlet members while by-passing said tube.

2. A corporation stop as claimed in claim 1 in which said means for maintaining the inner walls of said fluid tube in fluid tight contacting relationship includes a solder seal between the contacting inner walls of said tube, said solder seal being capable of being broken when said tube is re-shaped to provide through flow from said main to the service pipe.

3. A corporation stop as claimed in claim 1 in which said means connecting the ends of said tube respectively within the bores of said inlet and outlet members is soldered.

4. A corporation stop as claimed in claim 1 in which said means for maintaining the inner walls of said fluid tube in fluid tight contacting relationships includes a pair of shutoff blocks engaging the outer walls of said tube from opposite sides thereof, to hold the same pinched, bolt means holding together said shutoff blocks, and means on each of said shutoff blocks cooperating with cutout portions provided in said inlet and outlet fitting for maintaining said blocks in proper orientation with respect to said tube.

5. A corporation stop as claimed in claim 4 in which said blocks include a fluid tube contacting surface extending at least substantially the width of the tube so as to maintain an even pressure completely across the pinched tube.

6. A corporation stop as claimed in claim 4 in which said means on said blocks for orienting the same with respect to said tube includes oppositely disposed and extending keys cooperating with respective cutouts in said inlet and outlet fittings.

7. A corporation stop for use in making a service connection between a fluid main under pressure and a service pipe comprising: a rigid inlet member adapted to be operatively connected to the fluid main under pressure, said inlet member having external threads thereon and a through bore; a rigid outlet member adapted to be connected to the service pipe, said outlet member having external threads and a through bore; a tube made of a malleable and ductile metal and pinched so that its inner walls are constricted into fluid tight contacting relationship, the ends of said tube being connected to said inlet and outlet members; and means for rotating the corporation stop on its axis whereby torque is applied to the inlet member to threadedly connect the same to the fluid main, said last-mentioned means being arranged to by-pass torque around said tube to said inlet member.

8. A corporation stop as claimed in claim 7 in which said last-mentioned means includes a tubular member fitted over said outlet member and said tube, and ratchet means between said tubular member and said inlet member which permits said tubular member to rotate said inlet member in one direction.

9. A corporation stop as claimed in claim 8 wherein said inlet member includes cutout portions provided in the end wall thereof, and wherein said ratchet means includes ratchet teeth provided on the end of said tubular member for cooperating with said cutout portions.

10. A corporation stop as claimed in claim 9 in which said tubular member includes a socket portion for threadedly receiving the outlet member of the corporation stop, and a sleeve portion, said sleeve portion being pinned to said socket portion for longitudinal movement with respect thereto, and spring means normally urging said socket portion and said sleeve portion to an extended position.

11. A corporation stop as claimed in claim 10 in which said sleeve portion has an interior shoulder facing said socket portion in which said spring means includes a coil spring abutting said interior shoulder of said sleeve portion and an end of said socket portion.

12. A corporation stop as claimed in claim 11 including a solder seal between the contacting inner walls of said member, said solder seal being capable of being broken when the tube is re-shaped from its pinched condition to provide through flow from the main to the service pipe.

13. A corporation stop as claimed in claim 7 in which said last-mentioned means includes a pair of blocks, bolt means holding together said pair of blocks on opposite sides of said tube, said blocks and said inlet and outlet members, respectively, having means thereon for coupling the same to each other.

14. A corporation stop as claimed in claim 13 wherein said last-mentioned means includes oppositely disposed slots provided in said inlet and outlet members and oppositely disposed lugs on said blocks engaging the respective slots.

15. A corporation stop as claimed in claim 14 in which each of said blocks is provided with a portion engaging the pinched portion of said tubes, said portion maintaining the tube pinched until after the outlet member has been attached to the service pipe.

References Cited
UNITED STATES PATENTS

| | | | |
|---|---|---|---|
| 2,958,502 | 11/1960 | Grigsby | 251—8 |
| 3,117,615 | 1/1964 | Graven | 72—404 |
| 3,196,657 | 7/1965 | Fromson | 72—367 |

WILLIAM F. O'DEA, *Primary Examiner.*

D. R. MATTHEWS, *Assistant Examiner.*